US008650104B2

(12) United States Patent
Zimmerman et al.

(10) Patent No.: US 8,650,104 B2
(45) Date of Patent: Feb. 11, 2014

(54) ROUGH ORDER OF MAGNITUDE NARRATIVE SYSTEM

(75) Inventors: Marc D. Zimmerman, Concord, NC (US); Patrick J. Brennan, Mount Holly, NC (US); Benjamin Keith Ammons, Indian Trail, NC (US); Charles R. Ashman, Tega Cay, SC (US)

(73) Assignee: Bank of America Corporation, Charlotte, NC (US)

( * ) Notice: Subject to any disclaimer, the term of this patent is extended or adjusted under 35 U.S.C. 154(b) by 691 days.

(21) Appl. No.: 12/350,053

(22) Filed: Jan. 7, 2009

(65) Prior Publication Data

US 2010/0174573 A1 Jul. 8, 2010

(51) Int. Cl.
*G06Q 40/00* (2012.01)
*G06F 17/50* (2006.01)
*G06F 19/00* (2011.01)

(52) U.S. Cl.
USPC .................................. 705/35; 703/1; 700/97

(58) Field of Classification Search
USPC ............... 703/1; 700/90, 96, 97, 98, 106; 706/902, 919, 921, 923; 715/961, 964; 705/1, 1.1, 7.11, 7.12, 7.27, 7.36, 7.38, 705/7.35
See application file for complete search history.

(56) References Cited

U.S. PATENT DOCUMENTS

| | | | | |
|---|---|---|---|---|
| 5,189,606 | A * | 2/1993 | Burns et al. | 705/7.23 |
| 7,233,885 | B1 * | 6/2007 | Larabee et al. | 703/1 |
| 7,567,849 | B1 * | 7/2009 | Trammell et al. | 700/97 |
| 7,725,299 | B2 * | 5/2010 | Ramani et al. | 703/1 |
| 7,783,523 | B2 * | 8/2010 | Lopez et al. | 705/26.8 |
| 2003/0033038 | A1 | 2/2003 | Paris et al. | |
| 2008/0077364 | A1 * | 3/2008 | Wakelam et al. | 703/1 |
| 2008/0103991 | A1 * | 5/2008 | Moore et al. | 705/400 |
| 2008/0208654 | A1 * | 8/2008 | Nahikian et al. | 705/7 |

OTHER PUBLICATIONS

Arsht, Steven J "The Construction Equation" American School & University 80.8, Apr. 2009, pp. 16-20.*
McConville, John G "Cost Estimating of Overseas Construction Projects" Transactions of AACE International, 1994, pg. INT4.1.*
International Search Report and the Written Opinion of the Internatinal Searching Authority mailed Feb. 26, 2010 for International Application No. PCT/US 10/20336.

\* cited by examiner

*Primary Examiner* — Michael Harrington
(74) *Attorney, Agent, or Firm* — Michael A. Springs; Moore & Van Allen PLLC; Padowithz Alce

(57) ABSTRACT

Embodiments of the present invention provide systems, methods, and computer program products for modeling and estimating costs for a project, such as a construction or remodeling project. For example, embodiments of the present invention provide a project cost modeling system having a communication interface configured to receive a first level input for a first level project parameter from a user, a memory configured to store a rule, and a processor operatively connected to the communication interface and the memory and configured to determine a second level project parameter and a second level input for the second level project parameter based at least partially on a comparison of the first level input to the rule. The system is further configured to compute cost estimates and provide cost models based at least partially on the first level input, the second level input, and/or information about other projects stored in the memory.

26 Claims, 8 Drawing Sheets

FIG. 3

Project Office Reporting   ROM Source
File  Edit  View  Favorites  Tools  Help
Back ▸  ⊗  ☒  ⟳  ⌂  | Search  ⋆Favorites  ⊕ | ⬚ ⬚ ⬚ ⬚ | ⬚ ⬚ ⬚
Address ▢ http://                                                              ▸ Go Corporate Workplace                          Log Issue | Stockwatch | Home
                                             ROM Narrative  ▢▢▢

| Project Manager |                           Home | Projects ▷ | Users | Help | Logout ⊞ ROM Source » Renovation ( REN09CLT0104 ◊TBD )
Project Description: ▭ — 312          Project Director: ▭ — 314
                 ◂▸ — 322             Lease/Owned: |Leased| — 316

— 310

| First Level Project Parameter | Quantity | Unit | Description | Note |
|---|---|---|---|---|
| General { Building Type — 332 | 0 | - | | ◂▸ |
| Tier Requirements — 331 | 0 | - | | |
| Site Personnel Head Count | 0 | EA | Count — 325 | |
| Renovated Area — 323 | 0 | SF | Square Feet — 327 | |
| New Upfit (fit up) Area Affected | 0 | SF | Square Feet | |
| Occupant Band Level/Ratio | 0 | - | # of Band X, # of Band Y, # of Band Z, or % allocation if not known | ◂▸ |
| Is Demolition Required | 0 | SF | Minor above floor below ceiling | |
| Partitions & Doors { Fixed partitions | 0 | SF | Actual Square Footage if known | |
| Demountable Partitions | 0 | SF | Actual Square Footage if known | |
| Doors | 0 | EA | Actual quantity if known, Ratio of openings to floor area assumption... | |

— 321
— 329
— 320
— 328
— 324  — 326

SAVE — 330    APPLY — 340

▭ Done                                                          ⊕Trusted Sites
⊞Start | ROM Narrative

Corporate Workplace

Project Manager | Home | Projects ▷ | Users | Help | Logout

ROM Product » Renovation ( REN09CLT0104◇ TBD )

| | | |
|---|---|---|
| Building Area (SF): | 20,000 | Total Indexed Capital: 1,179,651 | Location/Night: 0.80 |
| # of Full-Time Employees Each: | 80 | Total Indexed Expense: 90,600 | Schedule From/To: 01/01/20 / 12/31/20 |
| SF/Full-Time Employee: | 250.00 | Total Indexed Capital/SF: 59 | Duration (Month): 12 |
| Cost/Full-Time Employee: | 15,878 | Total Indexed Expense/SF: 5 | Night Premium: No |
| Cost/SF: | 64 | Total Indexed Cost: 1,270,251 | Night Premium Percentage: N/A |

| Second Level Project Parameter | Quantity | Unit | $/Unit | Total | Cost/SF | Note |
|---|---|---|---|---|---|---|
| Capital | | | | | | |
| 1 Wages Administration | 12 | Month | 25800 | 247680 | 12.38 | |
| 2 PreConstruction | 1.50 | % of Cost | - | 11295 | 0.56 | |
| 3 Leed Documentation | 1.00 | % of Cost | - | 7643 | 0.38 | |
| 4 Demolition (Leed Cert) | 0 | SF Floor | 4.55 | 0 | 0.00 | |
| 5 Concrete | 20000 | SF Floor | 0 | 0 | 0.00 | |
| 6 Misc. Metals | 20000 | SF Floor | .33 | 5280 | 0.26 | |
| 7 Rough Carpentry | 20000 | SF Floor | 1 | 16000 | 0.80 | |
| 8 Plastic Laminate/Millwork | 0 | LF of Base/Wa... | 375 | 0 | 0.00 | |
| 9 Caulking & Sealant | 20000 | SF Floor | .30 | 4800 | 0.24 | |

SAVE | APPROVE FOR ESTIMATE

| Additional Scope Project Parameter | Quantity | Unit | $/Unit | Total | Cost/SF | Note |
|---|---|---|---|---|---|---|
| Capital | | | | | | |
| 1 Land | 0 | LS | 0 | 0 | 0.00 | |
| 2 Lease Commission | 0 | LS | 0 | 0 | 0.00 | |
| 3 Land Improvements | 0 | LS | 0 | 0 | 0.00 | |
| 4 Building Construction | 0 | LS | 0 | 0 | 0.00 | |
| 5 Tenant Finish | 0 | LS | 0 | 0 | 0.00 | |
| 6 Less-Leasehold Allowance | 0 | LS | 0 | 0 | 0.00 | |
| 7 Artwork Purchase | 0 | LS | 0 | 0 | 0.00 | |
| 8 Exterior Graphics/Signage | 0 | LS | 0 | 0 | 0.00 | |
| 9 CW Capital Management Fee | 6.5 | | | | 0.00 | |
| Subtotal Corporate Workplace Capital Expenditures | 0 | | 0 | 0 | | |
| 10 Furniture Refurbishment | | LS | | | 0.00 | |
| Subtotal Corporate Workplace Furniture Estimate | | | | 0 | 0.00 | |

SAVE | SKIP THIS | APPLY

FIG. 8

| | | Corporate Workplace | | | Log Issue \| Stockwatch \| Home<br>ROM Narrative<br>□ □ □ □ | | | |
|---|---|---|---|---|---|---|---|---|
| Project Manager | | | | | Home | Projects ▷ | Users | Help | Logout |

ROM Draft » Renovation ( REN09CIT0104◊TBD )
Building Area SF: 20,000    ROM/Building Area SF: 63.51
# of Full-Time Employees Each: 80    ROM/FTE: 15,878.14

| | Final Project Parameter | Cost Code | Acct Code | Unit Cost | Total |
|---|---|---|---|---|---|
| | Corporate Workplace Capital Expenditures | | | | |
| 1 | Land | 102000 | 171655 | 0.00 | 0.00 |
| 2 | Lease Commission | 200119 | 171655 | 0.00 | 0.00 |
| 3 | Land Improvements | 102600 | 171655 | 0.00 | 0.00 |
| 4 | Building Construction | 201000 | 171655 | 0.00 | 0.00 |
| 5 | Building Owned Interior Fitout | 210000 | 171655 | 0.00 | 0.00 |
| 6 | Building Equipment | 211000 | 171655 | 0.00 | 0.00 |
| 7 | Carpet/Window Treatments | 208880 | 171655 | 38.00 | 67549.00 |
| 8 | Architect & Engineering | 200110 | 171655 | 0.00 | 38596.00 |
| 9 | Tenant Finish | 210100 | 171655 | 0.00 | 0.00 |
| 10 | Building Leased Interior Fitout | 210200 | 171655 | 5911.47 | 88706.00 |
| 11 | Less-Leasehold Allowance | 101170 | 171655 | 0.00 | 0.00 |
| 12 | Cabling | 211200 | 171655 | 1250.00 | 80000.00 |
| 13 | Artwork Purchase | 212100 | 195450 | 0.00 | 0.00 |
| 14 | Exterior Graphics/Signage | 210440 | 171655 | 0.00 | 0.00 |

DONE

ROUGH ORDER OF MAGNITUDE NARRATIVE SYSTEM

FIELD

In general, embodiments of the present invention relate to systems, methods, and computer program products for estimating project costs. More specifically, embodiments of the present invention are directed to improving the accuracy of project cost estimates and/or models by using known information about a plurality of project parameters, information relating to previous projects, one or more rules, professional estimators, and/or customized cost data.

BACKGROUND

It is critical for any business operating on a budget to be able to make accurate project cost estimates. Unfortunately, few project cost modeling efforts ever produce numbers within twenty percent of actual project costs. Among other problems, today's cost modeling systems lack transparency, are expensive, and require too much information about the project to make accurate cost estimates. All of this can lead to inefficient allocation of funds, project delays, and financial waste.

Accordingly, the inventors have determined that it would be beneficial if a cost modeling system, method, and/or computer program product could be provided to predict cost estimates within twenty percent of the actual product costs. The inventors have also determined that it would be beneficial if the cost modeling system, method, and/or computer program product provided could improve transparency, be relatively inexpensive, and produce relatively accurate cost estimates and/or cost models from relatively little project information.

SUMMARY

Embodiments of the invention provide systems, methods, and computer program products that meet the cost-modeling needs identified by the inventors and/or meet other needs or provide other advantages. For example, embodiments of the present invention provide a method implemented by a computerized apparatus configured to estimate project costs, where the method involves: (1) receiving a first level input for a first level project parameter from a user; (2) determining a second level project parameter based at least partially on a comparison of the first level project parameter to a first rule; (3) determining a second level input for the second level project parameter based at least partially on a comparison of the first level input to a second rule; and (4) determining a project cost estimate based at least partially on the second level input. In one embodiment, the method further involves determining a cost estimate for the second level project parameter based at least partially on cost data stored in memory. The cost data may be updated substantially in real time. In some such embodiments, the method further includes storing the first level input, first level project parameter, second level input, second level project parameter, and cost estimate in a memory. In some embodiments, the cost estimate is based at least partially on a geographic location. In some embodiments, the method further involves configuring the cost estimate for application to a capital plan, which, in some instances, is performed substantially in real time.

In some embodiments, the method includes communicating the second level project parameter and the second level input to the user for verification. In some embodiments, the first level input relates at least partially to a quantity. In some embodiments, the first rule and the second rule relate at least partially to information from another project. In some instances the first rule and the second rule are updated by a user. In some embodiments, the method includes communicating any of the first level input, first level project parameter, second level input, and second level project parameter to an estimator for review.

Embodiments of the invention further provide a method for estimating costs of a project, where the method includes: (1) receiving a first input for a first project parameter from a user; (2) determining a second input for a second project parameter based at least partially on a comparison of the second project parameter to a rule; and (3) determining a project cost estimate based at least partially on the first input and the second input. In one embodiment, the rule relates at least partially to information from another project stored in a memory. In one embodiment, the user does not provide any input for the second project parameter and, instead, it is computed automatically by the cost modeling apparatus based at least partially on input received for the first project parameter, information stored in memory about other projects, and/or one or more rules stored in a memory.

In one embodiment, the method further involves determining a cost estimate for each of the first and second project parameters based at least partially on cost data stored in memory. Such cost data may be updated substantially in real time. The method may also involve storing the first input, first project parameter, second input, second project parameter, and cost estimate in a memory. In one embodiment, the cost estimate is based at least partially on a geographic location. In one embodiment, the cost data relates at least partially to a market price.

In some embodiments, the method includes configuring the project cost estimate for application to a capital plan. The method may also involve communicating the second project parameter and the second input to the user for verification. In some embodiments, the method also includes communicating any one or more of the first input, first project parameter, second input, second project parameter, and project cost estimate to an estimator for review.

Embodiments of the present invention also provide a project cost modeling system having a communication interface, a memory, and a processor operatively connected to the communication interface and the memory. The communication interface is generally configured to receive a first level input for a first level project parameter from a user. The memory is generally configured to store a rule. The processor is generally configured to determine a second level project parameter and a second level input for the second level project parameter based at least partially on a comparison of the first level input to the rule. In one embodiments, the rule relates at least partially to information about another project stored in the memory. In some embodiments, the memory is configured to store a second rule, and, in such embodiments, the processor is configured to determine another first level input for another first level project parameter based at least partially on a comparison of the another first level project parameter to the second rule.

In some embodiments of the system, the memory is further configured to store a cost rule at least partially related to a geographic location. In such an embodiments, the processor may be configured to determine a cost estimate for the second level project parameter based at least partially on a comparison of the second level input to the cost rule. The processor may be further configured to transform each of the first level input, first level project parameter, second level input, second level project parameter, and cost estimate into a format suitable for application to a capital plan. The processor may also store the first level input, first level project parameter, second level input, second level project parameter, and cost estimate in the memory.

In some embodiments of the system, the communication interface is configured to provide the user with a plurality of first level project parameters and to receive a first level input for less than all of the plurality of first level project parameters. In such an embodiment, the processor may be configured to determine a first level input for each of the plurality of first level parameters for which a first level input was not received from the communication interface, and then determine a cost model based at least partially on the first level inputs for the plurality of first level project parameters.

Embodiments of the present invention further provide a computer program product for estimating project costs, the computer program product having a computer-readable storage medium having computer-readable program code instructions stored therein. In one embodiment, the computer-readable program code instructions include: (1) first instructions configured to receive a first level input for a first level project parameter from a user; (2) second instructions configured to determine a second level project parameter based at least partially on a comparison of the first level project parameter to a first rule; (3) third instructions configured to determine a second level input for the second level project parameter based at least partially on a comparison of the first level input to a second rule; and (4) fourth instructions configured to determine a project cost estimate based at least partially on the second level input. The computer program product may further include: instructions configured to determine a cost estimate for the second level project parameter based at least partially on cost data stored in memory; instructions configured to communicate the second level project parameter and the second level input to the user for verification; instructions configured to communicate any of the first level input, first level project parameter, second level input, and second level project parameter to a second user for review; instructions configured to receive recommended changes to the first level input, first level project parameter, second level input, or second level project parameter from the second user; and instructions configured to communicate the recommended changes to the first user.

BRIEF DESCRIPTION OF THE DRAWINGS

Figure 1:
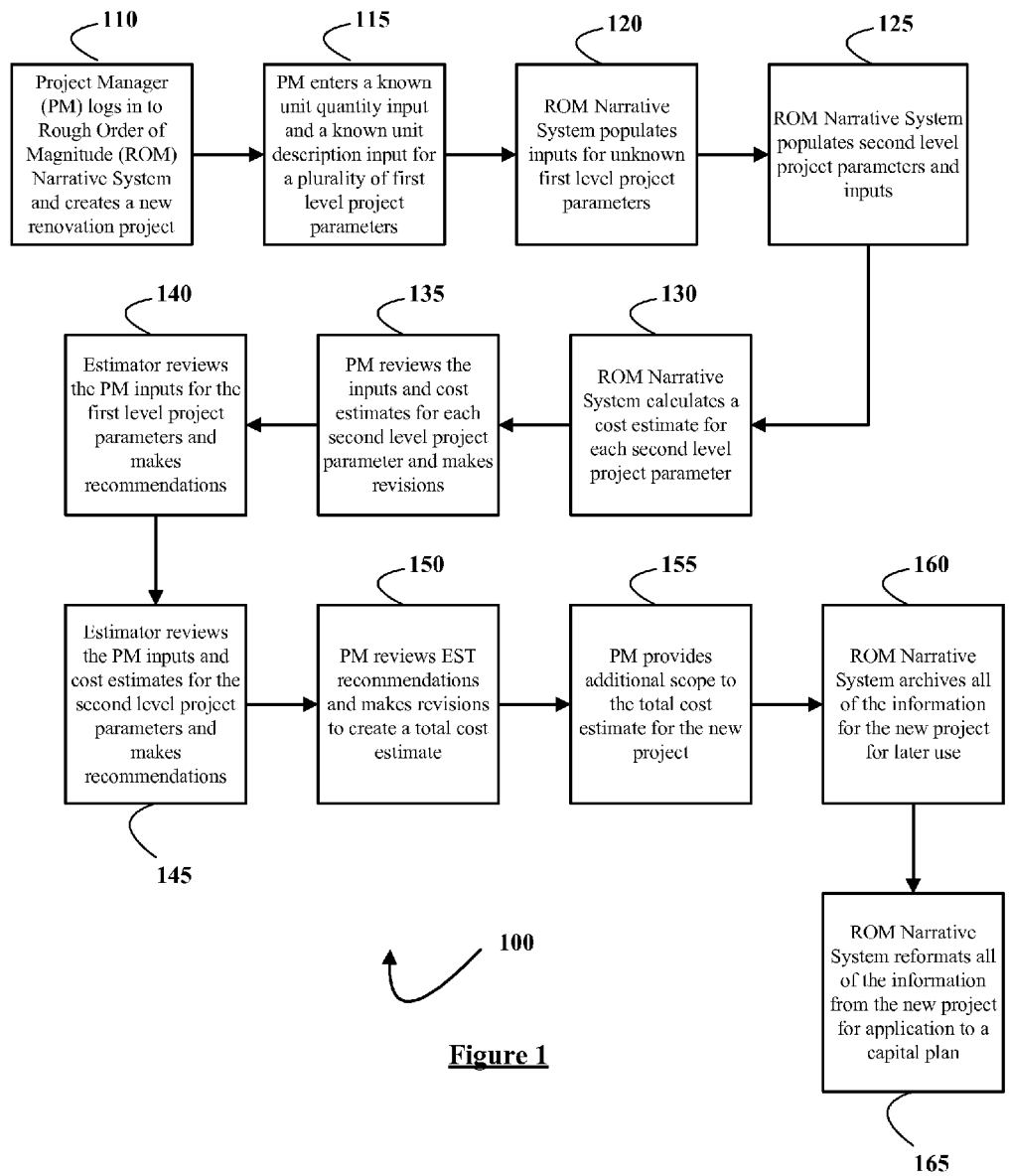
Figure 2:
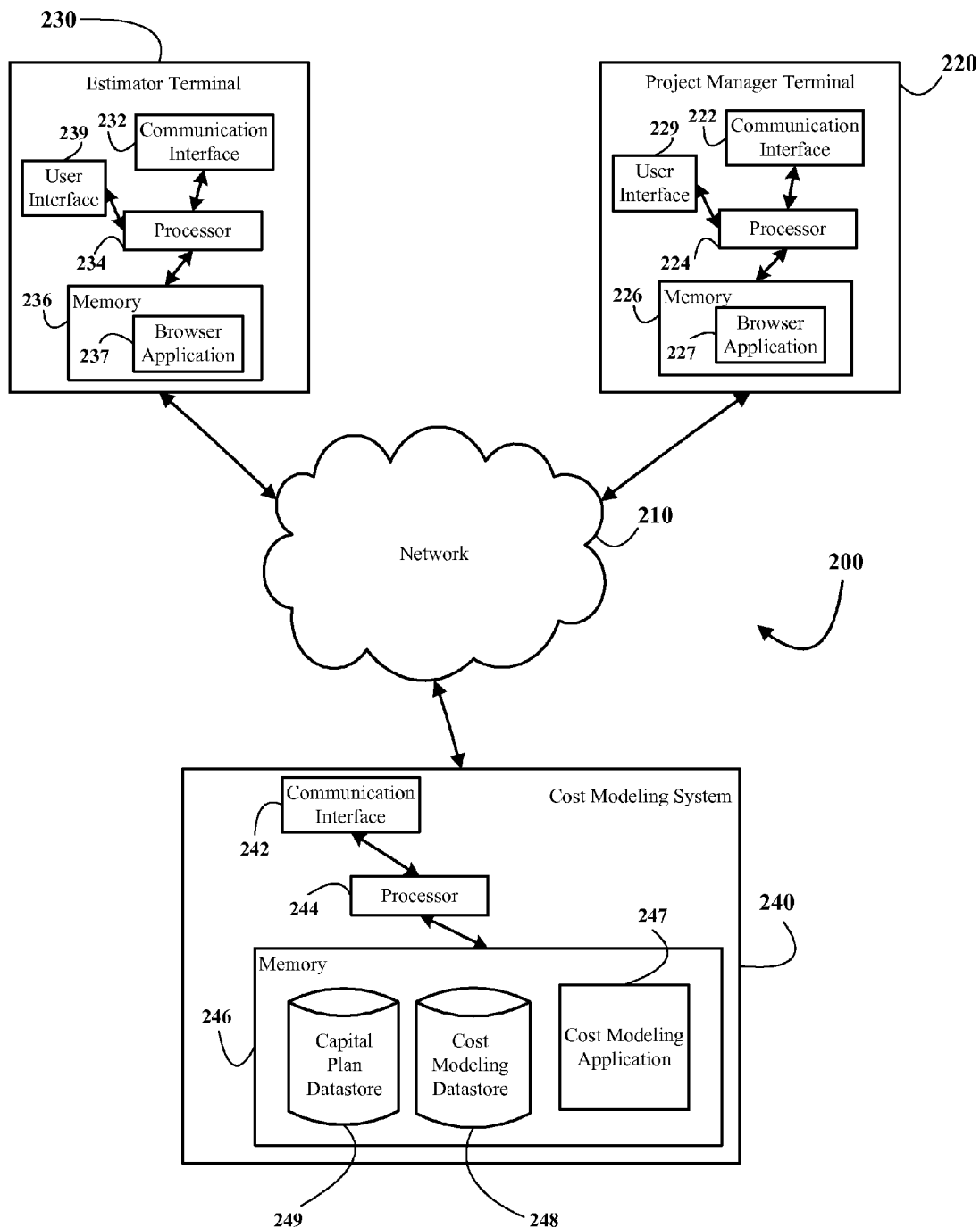

Having thus described embodiments of the present invention in general terms, reference will now be made to the accompanying drawings, which are not necessarily drawn to scale, and wherein:

FIG. 1 illustrates a flow diagram illustrating a general process flow of cost modeling using a Rough Order of Magnitude (ROM) Narrative System, in accordance with an embodiment of the present invention;

FIG. 2 illustrates a block diagram illustrating a ROM Narrative System, in accordance with an embodiment of the present invention;

FIG. 3 illustrates an exemplary graphical user interface displayed on a user terminal in the ROM Narrative System, in accordance with an embodiment of the present invention;

FIG. 4 illustrates an exemplary graphical user interface displayed on a user terminal in the ROM Narrative System, in accordance with an embodiment of the present invention;

Figure 5:
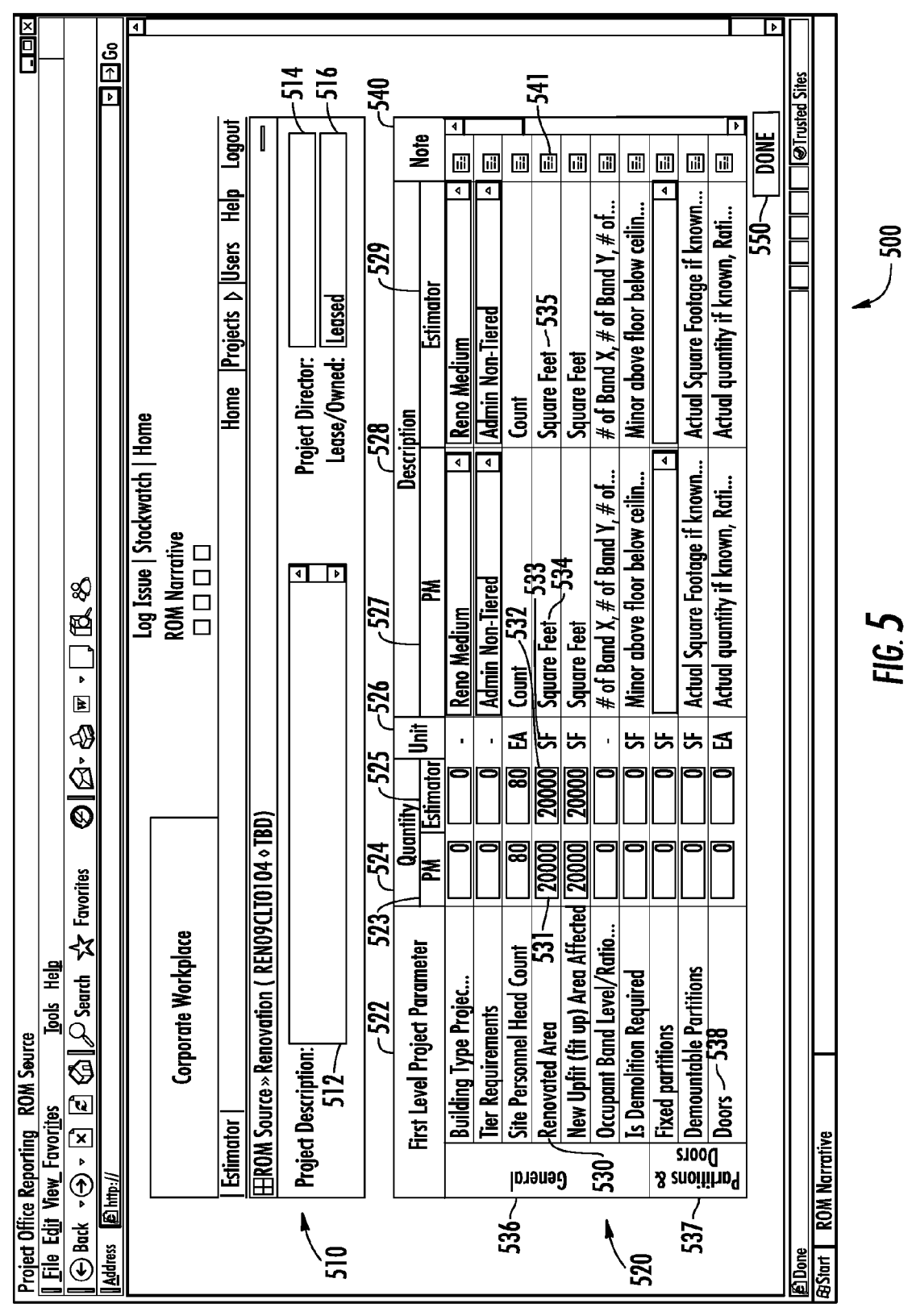

FIG. 5 illustrates an exemplary graphical user interface displayed on a user terminal in the ROM Narrative System, in accordance with an embodiment of the present invention;

Figure 6:
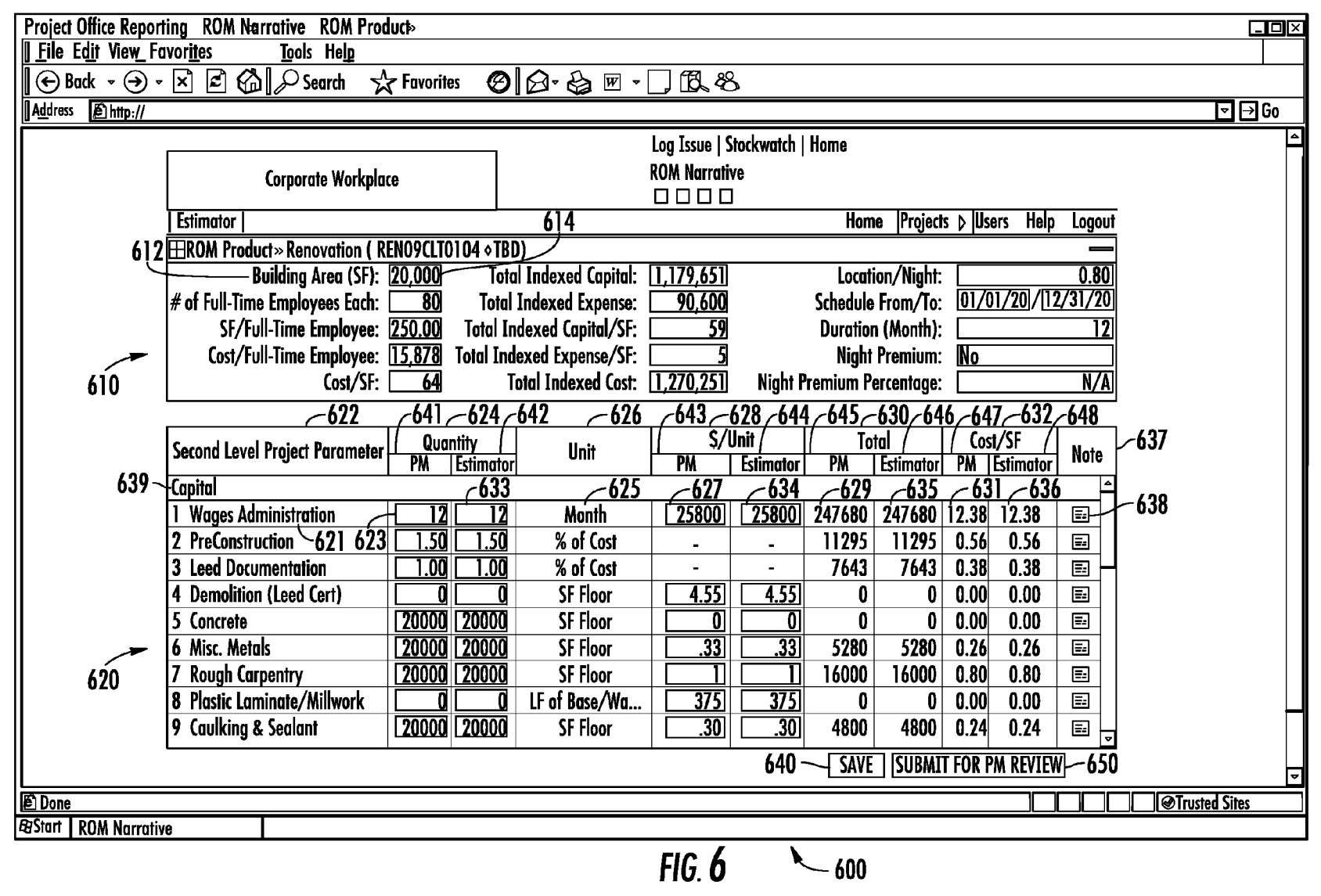

FIG. 6 illustrates an exemplary graphical user interface displayed on a user terminal in the ROM Narrative System, in accordance with an embodiment of the present invention;

FIG. 7 illustrates an exemplary graphical user interface displayed on a user terminal in the ROM Narrative System, in accordance with an embodiment of the present invention; and FIG. 8 illustrates an exemplary graphical user interface displayed on a user terminal in the ROM Narrative System, in accordance with an embodiment of the present invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form, and vice versa. Also, as used herein, the term "a" and/or "an" shall mean "one or more," even though the phrase "one or more" is also used herein. Like numbers refer to like elements throughout.

Although some of the embodiments of the invention described herein are generally described as involving a "bank," one of ordinary skill in the art will appreciate that other embodiments of the invention may involve other businesses and/or financial institutions that take the place of, or work in conjunction with, the bank to perform one or more of the processes, steps, and/or events described herein as being performed and/or participated in by a bank.

As will be appreciated by one of skill in the art, the present invention may be embodied as a method, system, computer program product, or a combination of the foregoing. Accordingly, embodiments of the present invention may take the form of an entirely software embodiment (including firmware, resident software, micro-code, etc.), or an embodiment combining software and hardware aspects that may generally be referred to herein as a "system." Furthermore, embodiments of the present invention may take the form of a computer program product including a computer-readable storage medium having computer-readable program code/computer-readable instructions embodied in the medium.

Any suitable computer-readable medium may be utilized. The computer-readable medium may be, for example but not limited to, an electronic, magnetic, optical, electromagnetic, infrared, or semiconductor system, apparatus, or device. For example, in one embodiment, the computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or other tangible optical or magnetic storage device. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in computer memory.

Computer program code/computer-readable instructions for carrying out operations of embodiments of the present invention may be written in an object oriented, scripted and/or unscripted programming languages such as Java, Perl, Smalltalk, C++, SAS, SQL, or the like. However, the computer program code/computer-readable instructions for carrying out operations of embodiments of the invention may also be written in conventional procedural programming languages, such as the "C" programming language or similar programming languages.

Embodiments of the present invention are described below with reference to flowchart illustrations and/or block diagrams of systems, methods, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

In general terms, embodiments of the present invention relate to systems, methods, and computer program products for estimating and/or modeling project costs. Although embodiments of the present invention may be used for estimating and/or modeling the costs for any type of project, much of the description herein, for simplicity, relates to estimating and modeling costs for construction projects. As such, it will be understood that most of the parties described herein, including project managers, directors, administrators, and estimators, work in connection with an organization engaged in estimating and/or modeling costs of construction projects. Additionally, although such organizations may work on a wide variety of construction projects, including, for example, those relating to renovation, base building, and infrastructure, much of the description herein, for simplicity, involves a construction project relating to renovation.

A renovation project, like any other construction project, may involve any number of project parameters that can affect the total project cost, including, for example, the size of the area to be renovated (sometimes referred to hereinafter as the "space"), the type of floor finish desired, the number of bathrooms involved, whether demolition is required, the number and type of employees who will occupy the space, whether a night premium for after-hours work must be added, the construction start date, the level of branding required for the space, the proper ratio of employees to offices for the space, and/or the anticipated occupancy date. Additionally, for each project parameter, there may be several inputs that affect the cost of that project parameter. For example, in a renovation project that requires more than one installation of a heating, ventilating, and air conditioning (HVAC) system, it may be critically important to know both how many HVAC systems are required but also what kind of HVAC system is required.

With so many variables, it is critically important that every input for every project parameter be as accurate as possible. Embodiments of the present invention seek to improve accuracy in a variety of ways. In one embodiment, a ROM Narrative System is configured to receive known inputs for some project parameters and populate inputs for other project parameters based at least partially on one or more rules. For example, often a project manager may not know enough information about a new project to make an input for every project parameter. In such a case, the ROM Narrative System may be configured to populate inputs for these unknown project parameters based on a rule that relates to, for example, other known inputs for the new project, inputs from a previous project, and/or past experience.

In another embodiment, the ROM Narrative System is configured to receive inputs for a plurality of relatively general (hereinafter "first level") project parameters and then populate inputs for a plurality of relatively specific (hereinafter "second level") project parameters that relate to the plurality of first level project parameters. In one embodiment, an input for a single first level project parameter may trigger populated inputs for several second level project parameters. For example, one first level project parameter may be the number of six person conference rooms to be renovated, and the second level project parameters associated with that first level project parameter may be the number of six person conference tables, conference chairs, televisions, plants, credenzas, and/or other items that are included in a six person conference room. In one embodiment, an input for one six person conference room may trigger the following populated inputs: one six person conference table, six conference chairs, one television, three plants, and one credenza. In this way, the ROM Narrative System is configured to populate information about a set of more detailed project parameters based on known information about a set of more generalized project parameters and/or one or more rules.

In many embodiments, the ROM Narrative System is configured to populate information for a project based on one or more rules. In one embodiment, the ROM Narrative System is configured to populate inputs for project parameters for which the project manager knows no information. For example, if a project manager does not know what level of branding to assign to a space, the project manager may decline to enter an input for that project parameter, so that the ROM Narrative System may make that decision itself based on, for example, one or more rules that relate to one or more previous, but similar projects. Similarly, the ROM Narrative System may also be configured to populate a plurality of second level project parameters. For example, as is often the case, a project manager will know the size of the area to be renovated, but the project manager may not know how many plumbing fixtures must be purchased and/or installed into that space. In such a case, the ROM Narrative System may make this determination itself based on one or more rules relating to plumbing fixtures.

In another embodiment, the ROM Narrative System is configured to populate cost inputs for a plurality of project parameters using stored cost data and/or one or more rules. This cost data may be customized in a variety of ways. For example, the cost data and/or one or more rules may account for price differences in different geographic locations by, for example, indexing labor, materials, and fuel costs to a certain region. For example, labor, materials, and fuel prices for construction projects in Charlotte, N.C. may cost less than for those in, for example, Chicago, Ill. In one embodiment, the ROM Narrative System may be configured to associate a multiplier of 0.8 to the Charlotte market and a 1.2 multiplier to the Chicago market to account for these price differences. These multipliers may apply to individual project parameters, or the multipliers may be generalized to apply to one or more or every project parameter, as in the above example, in order to better estimate project costs. In one embodiment, these multipliers reflect the industry means average for each geographic region and are updated periodically, such as every quarter year.

In another embodiment, the cost data and/or one or more rules may account for variability in commodity pricing. For example, the ROM Narrative System may be configured to access a database that is updated substantially in real time with market changes for commodity prices. In another embodiment, the cost data may account for non-conventional information, such as price increases as a result of, for example, shipping disruptions and/or inclement weather. In other embodiments, the cost data may be based on one or more internal rules that relate to known contract prices for labor, materials, and/or fuel. For any of these embodiments, the cost data may be updated regularly or in substantially real time, so that cost estimates calculated by a ROM Narrative System are based on substantially current cost data.

As another way to minimize error, one embodiment of the present invention includes using an estimator to review a project manager's and/or a ROM Narrative System's inputs, project parameters, cost estimates, and/or any other information related to a project. For example, in one embodiment, once a project manager determines a total cost estimate for a project, an estimator may review the project manager's total cost estimate, including the inputs and assumptions behind that total cost estimate, and recommend various revisions based on, for example, the estimator's own experience with previous projects. The estimator may make recommendations in a variety of ways. For example, in one embodiment, the ROM Narrative System includes a computer program product embedded in a web-enabled environment and includes input fields in a plurality of graphical user interfaces in a user terminal for the estimator to make inputs for each project parameter. In another embodiment, these separate input fields for the estimator are alongside the input fields used by the project manager for easy comparison. In another embodiment, the estimator may review the information compiled by the project manager and then write a separate paper report with recommendations. In any event, this review process is valuable for quality control purposes, especially where the estimator oversees multiple projects of a similar type and knows generally which project parameters are important and how much they should cost.

As another way to minimize error, one embodiment of the present invention includes allowing the project manager to review one or more inputs for one or more project parameters and/or any other information about the project. For example, in one embodiment, the ROM Narrative System may populate a plurality of second level project parameters and inputs based at least partially on a plurality of known inputs entered by a project manager for a plurality of first level project parameters. In such a case, the project manager may know that one or more of the inputs for the plurality of second level project parameters are inaccurate. If so, one embodiment of the ROM Narrative System allows the project manager to change these one or more inaccurate inputs. As another example, one embodiment of the present invention includes allowing a project director, estimator, and/or administrator to review and make changes to the project manager's inputs, thereby generating one or more parallel total cost estimates for the project.

Experimental use has shown that by combining one or more of the above-described features, embodiments of the present invention have produced unexpectedly accurate project cost estimates and/or models, including some within five percent of actual cost estimates. These results are most likely when there is participation from at least three sources, including the project manager, the estimator, and the ROM Narrative System. This kind of triple accounting of the project cost estimates and/or models and the inputs that go into them improves transparency in the cost modeling process, is relatively inexpensive, and may produce highly accurate project cost estimates from very few inputs and/or other known information about the particular project.

Additionally, in one embodiment, one or more inputs for one or more project parameters and/or cost estimates is entered into the capital plan for the organization. This event is beneficial because it allows funds to be allocated to the new project substantially in real time, thereby minimizing construction and communication delays. Embodiments of the present invention may be configured to implement information about the project into the capital plan in a variety of ways. In one embodiment, the ROM Narrative System is configured to reformat one or more inputs, project parameters, and/or cost estimates into a plurality of codes that are configured to be readable by the capital plan and/or any other system maintained by the construction organization. In this way, the information about the project is repackaged into a format capable of being synched with the capital plan and/or any other associated accounting system.

To give a more detailed example that involves some of these features, FIG. 1 provides a flow diagram illustrating general process flow 100 of a ROM Narrative System. This example illustrates a general process flow that a project manager may follow to create a total cost estimate and/or model for a new renovation project using a ROM Narrative System. In this embodiment, the ROM Narrative System is configured to receive unit and description inputs for a plurality of project parameters, but it will be understood that the inputs may be different for other embodiments. Also, in this embodiment, the ROM Narrative System is a cost modeling system embedded in a web-enabled environment, such that the ROM Narrative System is accessible to a plurality of users besides the project manager via the web. Accordingly, the project manager's inputs and estimates for the renovation project are reviewed by an estimator for quality control. Further, in this embodiment, once a total cost estimate and/or model for a project is generated, all of the information about the project, including every input, project parameter, and cost estimate, is archived for future use by other systems and/or parties. In addition, all of the information about the project is also reformatted and applied to a capital plan.

As represented by block 110, the project manager logs in to this embodiment of the ROM Narrative System and creates a new renovation project. Then, as represented by block 115, the project manager enters a known unit quantity input and a known unit description input for some of the first level project parameters. Then, as represented by block 120, the ROM Narrative System populates inputs for the rest of the first level project parameters that the project manager ignored. The ROM Narrative System populates these ignored first level project parameter inputs automatically based, for example, on other first level project parameter inputs entered by the project manager, historical information about past similar projects, and/or one or more rules. Then, as represented by block 125, the ROM Narrative System populates a plurality of second level project parameters and inputs based on the inputs for the first level project parameters. Then, as represented by block 130, the ROM Narrative System calculates a cost estimate for each second level project parameter.

Afterwards, as represented by block 135, the project manager reviews the inputs and cost estimates for each second level project parameter and makes revisions. After the project manager is finished revising, the information about the project is communicated to an estimator for review. As represented by block 140, the estimator reviews the project manager's inputs for the first level project parameters and makes recommendations. As represented by block 145, the estimator also reviews the project manager's inputs and cost estimates for the second level project parameters and makes recommendations.

Once the estimator is finished, the estimator's recommendations are communicated to the project manager for review. As represented by block 150, the project manager then reviews the estimator's recommendations and makes revisions to any input, first level project parameter, second level project parameter, and/or any cost estimate to create a total cost estimate. Then, as represented by block 155, the project manager provides additional scope to the total cost estimate for the new project, which may include, for example, providing information not typically accounted for in the ROM Narrative System calculations, such as specialized contract rates, land costs, etc.

After this additional scope is provided, as represented by block 160, the ROM Narrative System archives all of the information from the new project for later use, which may include, for example, cost information for future, similar renovation projects. Also, as represented by block 165, the ROM Narrative System reformats all of the information from the new project for application into a capital plan.

Although not illustrated, in one embodiment, one or more project directors, administrators, and/or one or more other parties may participate in some or all of the events illustrated in FIG. 1 and/or in additional events not described. For example, a project director may review all of the information about a project, including every input associated with every project parameter and/or cost estimate, before the project manager is allowed to apply the information to a capital plan. As another example, an administrator may assign the project manager's project to one or more particular estimators for review. As a further example, an administrator may conduct a review of the project manager's inputs and/or assumptions before, after, or substantially simultaneous with assigning it to an estimator. As another example, a facility partner to a construction organization may access the ROM Narrative System and enter a plurality of inputs for cost estimates described herein. It should be understood that, in some embodiments, any party, including one or more project directors, estimators, managers, and/or administrators, may access one or more portions of the ROM Narrative System and/or participate in one or more of the events described in FIG. 1.

Referring now to FIG. 2, a ROM Narrative System 200 is provided, which includes Network 210, Project Manager Terminal 220, Estimator Terminal 230, and Cost Modeling System 240. Each of the terminals and systems of ROM Narrative System 200 is operatively coupled to Network 210. Network 210 may include one or more separate networks, and may include a local area network (LAN), a wide area network (WAN), and/or a Global Area Network (GAN), such as the Internet. It should be understood that Network 210 may include wireless and/or wireline technology.

In many embodiments, Project Manager Terminal 220 is configured to display a plurality of graphical user interfaces and is configured to allow a project manager to communicate with other networks and/or portions of ROM Narrative System 200 and/or vice versa. For example, the project manager may log in to one or more portions of ROM Narrative System 200 via Project Manager Terminal 220. As another example, the project manager may use Project Manager Terminal 220 to enter a known unit quantity input and a known unit description input for a plurality of first and/or second level project parameters. In one embodiment, Project Manager Terminal 220 facilitates substantially real-time communication between the Project Manager and various portions of ROM Narrative System 200.

Project Manager Terminal 220 may include, for example, a portion of a computer network, a personal computer system, a mobile phone, a personal digital assistant, a public kiosk, and/or some other type of computing device. In one embodiment, as illustrated, Project Manager Terminal 220 includes Communication Interface 222, Processor 224, Memory 226 having Browser Application 227, and User Interface 229. Communication Interface 222 is operatively coupled to Processor 224, which is operatively coupled to User Interface 229 and Memory 226 having Browser Application 227.

Each communication interface described herein, including Communication Interface 222, includes hardware, and, in some instances, software, that enables a portion of ROM Narrative System 200, such as Project Manager Terminal 220, to transport, send, receive, and/or otherwise communicate information to and/or from the communication interface of the one or more other portions of ROM Narrative System 200. For example, Communication Interface 222 of Project Manager Terminal 220 may include a modem, server, and/or other electronic device that operatively couples Project Manager Terminal 220 to another electronic device, such as the electronic devices that make up Estimator Terminal 230, Cost Modeling System 240, and/or one or more networks linking Project Manager Terminal 220 to these other portions of ROM Narrative System 200.

Each processor described herein, including Processor 224, includes circuitry required for implementing the audio, visual, and/or logic functions of that portion of ROM Narrative System 200 including the processor. For example, Processor 224 of Project Manager Terminal 220 may include a digital signal processor device, a microprocessor device, and various analog-to-digital converters, digital-to-analog converters, and other support circuits. Control and signal processing functions of Project Manager Terminal 220 may be allocated between these devices according to their respective capabilities. Processor 224 may include functionality to operate one or more software programs based on computer-readable instructions thereof, which may be stored, for example, in Browser Application 227 of Memory 226 of Project Manager Terminal 220.

Each memory device described herein, including Memory 226 for storing the Browser Application 227 and other data, may include any computer-readable medium. For example, Memory 226 of Project Manager Terminal 220 may include volatile memory, such as volatile Random Access Memory (RAM) including a cache area for the temporary storage of data. Memory 226 may also include other non-volatile memory, which can be embedded and/or may be removable. The non-volatile memory can additionally or alternatively include an EEPROM, flash memory, or the like. Memory 226 can store any of a number of pieces of information and data used by Project Manager Terminal 220 to implement the functions of Project Manager Terminal 220.

Browser Application 227 may be any computer-readable instructions configured to allow Project Manager Terminal 220 to communicate with other devices over a network using, for example, one or more network and/or system communication protocols. For example, in one embodiment, Browser Application 227 includes an Internet Web browser used by Project Manager Terminal 220 for communicating with one or more portions of ROM Narrative System 200.

User Interface 229 generally includes one or more user output devices, such as a display and/or speaker, for communicating information to a Project Manager. User Interface 229 further includes one or more user input devices, such as one or more keys or dials, a touch pad, touch screen, mouse, microphone, camera, and/or the like, for receiving information from the Project Manager.

FIG. 2 also illustrates Estimator Terminal 230 in accordance with an embodiment of the invention. In many embodiments, Estimator Terminal 230 is configured to display a plurality of graphical user interfaces and is also configured to allow an estimator to communicate with other networks and/or portions of ROM Narrative System 200 and/or vice versa. For example, in at least one embodiment, Estimator Terminal 230 is configured to review information related to a project cost estimate, such as a unit quantity and a unit description, and to communicate recommendations on revising that information. As another example, the estimator may use Estimator Terminal 230 to enter a revised unit quantity input and a revised unit description input for a plurality of project parameters into one or more portions of ROM Narrative System 200. In one embodiment, Estimator Terminal 230 facilitates substantially real-time communication between the Project Manager and various portions of ROM Narrative System 200.

Estimator Terminal 230 may include, for example, a portion of a computer network, a personal computer system, a mobile phone, a personal digital assistant, a public kiosk, and/or some other type of computing device. In one embodiment, as illustrated, Estimator Terminal 230 includes Communication Interface 232, Processor 234, Memory 236 having Browser Application 237, and User Interface 239. Further, Communication Interface 232 is operatively coupled to Processor 234, which is operatively coupled to User Interface 239 and Memory 236 having Browser Application 237.

Browser Application 237 may be any computer-readable instructions configured to allow Estimator Terminal 230 to communicate with other devices over a network using, for example, one or more network and/or system communication protocols. For example, in one embodiment, Browser Application 237 includes an Internet Web browser used by Estimator Terminal 230 for communicating with Cost Modeling System 240 and/or one or more other portions of ROM Narrative System 200.

User Interface 239 generally includes one or more user output devices, such as a display and/or speaker, for communicating information to a Estimator. User Interface 239 further includes one or more user input devices, such as one or more keys or dials, a touch pad, touch screen, mouse, microphone, camera, and/or the like, for receiving information from the Estimator.

Also illustrated in FIG. 2 is Cost Modeling System 240, in accordance with one embodiment of the present invention. Cost Modeling System 240 may include, for example, a portion of a computer network, an engine, a platform, a network server, a database system, a front end system, a back end system, a personal computer system, and/or some other type of computing device. In one embodiment, as illustrated, Cost Modeling System 240 includes Communication Interface 242, Processor 244, and Memory 246 having Capital Plan Datastore 249, Cost Modeling Application 247, and Cost Modeling Datastore 248. Communication Interface 242 is operatively coupled to Processor 244, which is operatively coupled to Memory 246 having Capital Plan Datastore 249, Cost Modeling Application 247, and Cost Modeling Datastore 248.

In at least one embodiment, Cost Modeling Application 247 includes computer-readable instructions configured to instruct Processor 244 to populate inputs for project parameters based on, for example, information about and/or rules relating to previous projects stored in Cost Modeling Datastore 248. In another embodiment, Cost Modeling Application 247 includes computer-readable instructions configured to instruct Processor 244 to populate a plurality of second level project parameters based on a plurality of first level project parameters. In another embodiment, Cost Modeling Application 247 includes computer-readable instructions configured to compare cost data stored in Cost Modeling Datastore 248 to one or more of the project manager's inputs and determine one or more cost estimates. In some embodiments, Cost Modeling Application 247 is also configured to instruct Processor 244 to store any of the information related to the project, including any input, first level project parameter, second level project parameter, and/or cost estimate, for future use. Additionally, in one embodiment, Cost Modeling Application 247 may be configured to instruct Processor 244 to reformat any of the information related to the project for application to another system and/or application. As one example, once a project manager determines a final total cost estimate for a project, Cost Modeling System 240 may be configured to reformat and apply the final total cost estimate to the construction organization's capital plan so that funds may be allocated to the project substantially in real time.

In addition to the customized cost data, Cost Modeling Datastore 248 may also include a plurality of first level, second level, additional scope, and/or final project parameters, in addition to quantity, unit, and/or description inputs therefor. In at least one embodiment, Cost Modeling Datastore 248 provides a substantially real-time representation of the customized cost data and/or other information stored therein. Thus, when Processor 244 accesses Cost Modeling Datastore 248, the information stored therein is substantially current.

In addition to information about a capital plan, Capital Plan Datastore 249 may include cost codes and account codes enabling a variety of project information to be applied to the capital plan and/or other systems. In at least one embodiment, Capital Plan Datastore 249 provides a substantially real-time representation of information about the capital plan and/or the cost and/or account codes. Thus, when Processor 244 accesses Capital Plan Datastore 249, the information stored therein is substantially current.

It should also be understood that some or all of the portions of ROM Narrative System 200 may be combined into a single portion, e.g. Project Manager Terminal 220 and Estimator Terminal 230 may be combined into a single ROM Narrative System Terminal configured to perform all of the same functions as the embodiments of the Project Manager Terminal and the Estimator Terminal described herein. Further, some or all of the portions of the portions of ROM Narrative System 200 may also be combined into a single portion, e.g. Cost Modeling Datastore 248 and Capital Plan Datastore 249 may be combined into a single Cost Modeling and Capital Plan Datastore configured to perform all of the same functions as the embodiments of the Cost Modeling Datastore and the Capital Plan Datastore described herein.

Likewise, some or all of the portions of ROM Narrative System 200 may be separated into two or more distinct portions, e.g. Cost Modeling System 240 may be separated into an Information Input System configured to populate a plurality of inputs for a plurality of project parameters, including, for example, quantity, unit, and/or description inputs, and a Cost Calculation System configured to calculate a plurality of cost estimates, including, for example, cost/sf (cost per square foot) estimates and total cost estimates. Further, some or all of the portions of the portions of ROM Narrative System 200 may be separated into two or more distinct portions, e.g. Cost Modeling Datastore 248 may be separated into a Previous Project Information Datastore configured to receive, store, and retrieve information related to previous construction projects and a Customized Cost Data Datastore configured to receive, store, and retrieve customized cost data, including, for example, current market rates for commodities.

Now reference will be made to a more detailed embodiment of the present invention. In this embodiment, Project Manager Terminal 220 and Estimator Terminal 230 in ROM Narrative System 200 are configured to display one or more of the graphical user interfaces (hereinafter "browser screens") illustrated in FIGS. 3-8. It will be understood that these browser screens may include an Internet web page, an intranet web page, or some other graphical user interface. It will also be understood that each browser screen is configured to navigate to another browser screen and/or vice versa. For example, Browser Screen 300 may be configured to navigate to and/or from Browser Screen 400 and/or to and/or from any other browser screen described herein. It will be further understood that the ROM Narrative System in this embodiment is configured to implement one or more events in general process flow 100 described in FIG. 1.

Referring now to FIG. 3, Browser Screen 300 includes Project Description Box 310, First Level Project Parameter Box 320, Save Button 330, and Apply Button 340. Project Description Box 310 further includes Project Description Field 312, Project Director Field 314, and Lease/Owned Field 316. First Level Project Parameter Box 320 further includes First Level Project Parameter List 322, Quantity List 324, Unit List 326, and Description List 328. Each list includes a plurality of items that correspond to other items on other lists. For example, First Level Project Parameter List 322 includes Renovated Area First Level Project Parameter 321, and Quantity List 324 includes Quantity Field 323 that corresponds to Renovated Area First Level Project Parameter 321, as do Unit Field 325 in Unit List 326 and Description Field 327 in Description List 328. Further, as illustrated, First Level Project Parameter List 322 may be divided up into categories by project parameter type, e.g. General Category 329 includes Renovated Area First Level Project Parameter 321.

In one embodiment, Browser Screen 300 is configured to implement the event represented by block 115 in FIG. 1. Thus, it will be understood that every project parameter in First Level Project Parameter List 322 is a first level project parameter that will trigger one or more second level project parameters and inputs, as shown in Browser Screen 400 in FIG. 4. So, after a project manager logs in and creates a new renovation project, the project manager may enter a known unit quantity input and a known unit description input for any of the first level project parameters illustrated in Browser Screen 300. For example, if known, the project manager may enter an input for Quantity Field 323 in Quantity List 324 that corresponds to Renovated Area First Level Project Parameter 321. As shown from Unit Field 325 and Description Field 327, the project manager's input for Renovated Area First Level Project Parameter 321 will be in units of square feet.

It will be understood that some unit quantity and unit description fields may not be fillable, e.g. the ROM Narrative System may automatically populate one or more inputs that the project manager may not be able to change. For example, FIG. 3 shows that the project manager may enter an input for Renovated Area First Level Project Parameter 321 in Quantity Field 323, but that corresponding Unit Field 325 and Description Field 327 are automatically described in units of square feet.

Also, it will be understood that Browser Screen 300 shows an exemplary list of first level project parameters in an exemplary list of first level project parameter categories and subcategories. Indeed, these first level project parameters may only constitute a fraction of the total number of first level project parameters used to estimate project costs. Besides those shown in FIG. 3, other first level project parameters may include carpet, ceiling finishes, wall finishes, furniture/technology, number of FTEs open office, number of FTEs enclosed office, number of 2 person conference rooms, number of 4 person conference rooms, number of 6 person conference rooms, number of 8 person conference rooms, number of 10 person conference rooms, number of 12 person conference rooms, number of 14 person conference rooms, number of 16 person conference rooms, number of 18 person conference rooms, number of 20 person conference rooms, number of "chat" areas, women's restroom, men's restroom, branding level, associate hub size, elevator lobby size and type, millwork, HVAC system, number of plumbing fixtures, sprinkler coverage, electrical service/load, garage area/no. of cars, anticipated construction start data, and/or anticipated occupancy date. Additionally, Browser Screen 300 may include other categories and subcategories besides those shown, including finishes and/or furniture/technology.

Once the project manager enters a unit quantity input and a unit description input for each of the first level project parameters in Project Parameter List 322, the project manager may save those inputs by selecting Save Button 330 and/or applying those inputs to the next one or more events in process flow 100 by selecting Apply Button 340. In this embodiment, once the project manager enters, saves, and applies the one or more inputs, Browser Screen 300 navigates to Browser Screen 400 illustrated in FIG. 4.

As illustrated in FIG. 4, Browser Screen 400 includes Project Description Box 410, Second Level Project Parameter Box 420, Save Button 440, and Approve For Estimate Button 450. Project Description Box 410 further includes a plurality of second level project parameters and second level project parameter fields, including, for example, Building Area Parameter 412 and Quantity Field 414. In this embodiment, these second level project parameters and their corresponding inputs were populated by the ROM Narrative System based at least partially on previous information received by the ROM Narrative System, such as, for example, one or more first level project parameter inputs from Browser Screen 300. For example, Building Area Second Level Project Parameter 412 and its corresponding input in Unit Field 414 may be based at least partially on an input in Unit Field 323 corresponding to Renovated Area First Level Project Parameter 321 from Browser Screen 300.

Further, Second Level Project Parameter Box 420 includes Second Level Project Parameter List 422, Quantity List 424, Unit List 426, $/Unit (dollar per unit) List 428, Total List 430, and Cost/SF (cost per square foot) List 432. As with Project Description Box 410, the second level project parameters in Second Level Project Parameter List 422 and their corresponding inputs were populated by the ROM Narrative System based at least partially on previous information received by the ROM Narrative System, such as, for example, one or more first level project parameter inputs from Browser Screen 300. For example, Wages Administration Second Level Project Parameter 421 and its corresponding input in Unit Field 423 may be based at least partially on an input in Unit Field 332 corresponding to Site Personnel Head Count First Level Project Parameter 331 from Browser Screen 300.

Each list includes a plurality of items that correspond to other items on other lists. For example, Wages Administration Second Level Project Parameter 421 in Second Level Project Parameter List 422 corresponds to Quantity Field 423, Unit Field 425, $/Unit Field 427, Total Field 429, and Cost/SF Field 431 in the other lists. Further, Second Level Project Parameter List 422 may be further divided up by project parameter category and/or subcategory, such as Capital Category 439 having Subtotal Cost of Work Subcategory, Subtotal Contractor Applied Cost Subcategory, and Subtotal Other Subcategory (not shown), and Expense Category having Subtotal Expense Subcategory (also not shown).

Further, the ROM Narrative System may be configured to account for an input change in one list item by making corresponding input changes in other corresponding items on the other lists. For example, a change in the input in Quantity Field 423 that corresponds to Wages Administration Second Level Project Parameter 421 may affect the input for $/Unit Field 427, Total Field 429, and Cost/SF Field 431. The corresponding items may interrelate based at least partially on some mathematical algorithm and/or one or more rules. For example, in this embodiment, the input for Total Field 429 equals the input for Quantity Field 423 multiplied by the input for $/Unit Field 427, which is then further multiplied by an index multiplier of 0.8 (not shown) to index for fuel, materials, and/or fuel costs at this particular project location.

In one embodiment, Browser Screen 400 is configured to implement the event represented by block 135 in FIG. 1. After the project manager enters inputs for as many first level project parameters as are known, the ROM Narrative System performs the processes represented by blocks 120, 125, and 130 in FIG. 1, and then presents Browser Screen 400 to the project manager. The project manager then reviews the plurality of second level project parameters, the plurality of inputs, and the plurality of cost estimates in Browser Screen 400 and makes any revisions as needed. For example, based on a previous input for a first level project parameter (not shown in Browser Screen 300), the ROM Narrative System may populate the inputs illustrated in FIG. 4 that correspond to Wages Administration Second Level Project Parameter 421. However, the project manager may know from experience that, instead of $25,800 per month, the input for $/Unit Field 428 should be $30,000 per month. As such, the ROM Narrative System is configured to allow the project manager to change the input for $/Unit Field 428, which may then affect one or more other inputs and/or any first and/or second level project parameters in some way. For example, if the project manager enters the input of 30,000 into $/Unit Field 427, the input for Total Field 429 may automatically change to 360,000 and the input for Cost/SF Field 431 may automatically change to 18.00. In another example, as illustrated in FIG. 3, the ROM Narrative System may be configured to apply a multiplier to those inputs in Total List 430 and Cost/SF List 432 to index labor, materials, and/or fuel costs by geographic region. Thus, while the inputs in Unit Field 423 and $/Unit Field 427 should result in inputs of 309,600 and 15.48 in Total Field 429 and Cost/SF Field 431 respectively, the geographic location multiplier 0.8 produces inputs of 247,680 and 12.38 for those fields instead.

As with Browser Screen 300, it will be understood that some fields in Browser Screen 400 may not be directly fillable, e.g. the ROM Narrative System may automatically populate one or more inputs that the estimator may not be able to change at all and/or the ROM Narrative System may populate one or more inputs based on other inputs for corresponding items. For example, FIG. 4 shows that the project manager may enter an input associated with Wages Administration Second Level Project Parameter 421 in Quantity Field 423, but that corresponding Unit Field 425 and Total Field 429 are automatically filled by the ROM Narrative System and may not be directly changed by the project manager. In this case, Unit Field 425 is not changeable at all because the ROM Narrative System is configured to read that field in units of square feet. On the other hand, Total Field 429 may not be directly changed, but it may be changed indirectly by changing, for example, the input in $/Unit Field 427.

Also, it will be understood that Browser Screen 400 shows an exemplary list of second level project parameters in an exemplary list of second level project parameter categories and subcategories. Indeed, these second level project parameters may only constitute a fraction of the total number of second level project parameters used to estimate project costs. Besides those shown in FIG. 4, other second level project parameters may include spray fireproofing, doors/frames/hardware, glass & glazing, drywall/metal studs/insulation, movable partition allowance, acoustical ceilings, paint and wall covering, carpet protection, special flooring, granite tops, sound masking, window treatments, appliances, fire extinguishers and cabinets, branding, special signage, code required signage, material logistics, plumbing systems, fire protection, HVAC—review each project, electrical-lighting, miscellaneous, combined OHP and AGCs from new MS agr, contractor applied cost contingency, A/E fees, carpet, cabling, ROM Product PM fees, furniture open office/closed/ and com, AV equipment cost, security equipment cost, artwork, furniture reconfigure/move, plants, telecom expense (CW), telecom expense (LOB), and/or CW management fee. Additionally, Browser Screen 400 may include other categories and subcategories besides those shown, including Subtotal Cost of Work Subcategory, Subtotal Contractor Applied Cost Subcategory, Subtotal Other Subcategory, Expense Category, Subtotal Expense Subcategory, and Grand Total plus Location Index Category.

After reviewing and revising, the project manager may save the revised inputs by selecting Save Button 440. The project manager may also instruct the ROM Narrative System to communicate the inputs, along with all other information about the project, to an estimator to review by selecting Approve For Estimate Button 450. Once done, the ROM Narrative System communicates information about the project to an estimator in the form of Browser Screen 500 illustrated in FIG. 5.

Browser Screen 500 illustrated in FIG. 5 is similar to Browser Screen 300 illustrated in FIG. 3, except that there are a plurality of fields for an estimator to enter inputs as well as those for a project manager. More specifically, Browser Screen 500 includes Project Description Box 510, First Level Project Parameter Box 520, and Done Button 550. Project Description Box 510 further includes Project Description Field 512, Project Director Field 514, and Lease/Owned Field 516. First Level Project Parameter Box 520 further includes First Level Project Parameter List 522, Quantity List 524, Unit List 526, Description List 528, and Note List 540. Quantity List 524 further includes Project Manager Quantity List 523 and Estimator Quantity List 525, and Description List 528 further includes Project Manager Description List 527 and Estimator Description List 529.

Each list includes a plurality of items that correspond to other items on other lists. For example, First Level Project Parameter List 522 includes Renovated Area First Level Project Parameter 530, and Project Manager Quantity List 523 includes Quantity Field 531 that corresponds to Renovated Area First Level Project Parameter 530, as do Quantity Field 532 in Estimator Quantity List 525, Unit Field 533 in Unit List 526, Description Field 534 in Project Manager Description List 527, and Description Field 535 in Estimator Description List 529. Further, as illustrated, First Level Project Parameter List 522 may be divided up into categories and/or subcategories by project parameter type, e.g. General Category 536 includes Renovated Area First Level Project Parameter 530 and Partitions & Doors Category 537 includes Doors First Level Project Parameter 538.

In one embodiment, Browser Screen 500 is configured to implement the event represented by block 140 in FIG. 1. Accordingly, once Browser Screen 500 is presented to the estimator, the estimator reviews every input associated with every first level project parameter and makes recommendations. As illustrated, the estimator may recommend inputs associated with first level project parameters by directly entering the recommended input alongside the project manager's input. For example, as illustrated in FIG. 5, the project manager has entered the input 20,000 into Quantity Field 531 associated with Renovated Area First Level Project Parameter 530. As illustrated, the estimator may agree with the project manager's input associated with this first level project parameter and recommend using that same input by also entering 20,000 into Quantity Field 532 in Estimator Quantity List 525. In another embodiment not shown, the estimator may know, based on past experience, that the renovated area is actually 19,800 square feet, not 20,000 square feet. Accordingly, the estimator may recommend the different amount by entering it into Quantity Field 532 and note the reason for the change in a Note Field (not shown) by selecting Note Button 541 in Note List 540. After reviewing, revising, and recommending, the estimator may select Done Button 550 to navigate to Browser Screen 600 illustrated in FIG. 6.

As with Browser Screen 300 illustrated in FIG. 3, it will be understood that some unit quantity and unit description fields may not be fillable in Browser Screen 500, e.g. the ROM Narrative System may automatically populate one or more inputs that the estimator may not be able to change. For example, FIG. 5 shows that the estimator may enter the unit quantity for Renovated Area First Level Project Parameter 530 in Quantity Field 532, but that corresponding Unit Field 523 and Description Field 535 in Estimator Description List 529 are automatically described in units of square feet.

Also as with Browser Screen 300, it will be understood that Browser Screen 500 shows an exemplary list of first level project parameters in an exemplary list of first level project parameter categories and subcategories. Indeed, these first level project parameters, categories, and subcategories may only constitute a fraction of the total number of first level project parameters used to estimate project costs. Other first level project parameters may also be used, including those mentioned above in connection with FIG. 3. Additionally, other first level project parameter categories and/or subcategories may also be used, including those mentioned above in connection with FIG. 3.

Referring now to FIG. 6, Browser Screen 600 is similar to Browser Screen 400 illustrated in FIG. 4, except that there are a plurality of fields for an estimator to enter inputs as well as those for a project manager. More specifically, Browser Screen 600 includes Project Description Box 610, Second Level Project Parameter Box 620, Save Button 640, and Submit For PM Review Button 650. Project Description Box 610 further includes a plurality of second level project parameters and second level project parameter fields, including, for example, Building Area Parameter 612 and Quantity Field 614. Further, Second Level Project Parameter Box 620 includes Second Level Project Parameter List 622, Quantity List 624, Unit List 626, $/Unit (dollar per unit) List 628, Total List 630, and Cost/SF (cost per square foot) List 632. Quantity List 624 further includes Project Manager Quantity List 641 and Estimator Quantity List 642, $/Unit List 628 further includes Project Manager $/Unit List 643 and Estimator $/Unit List 644, Total List 630 further includes Project Manager Total List 645 and Estimator Total List 646, and Cost/SF List 632 further includes Project Manager Cost/SF List 647 and Estimator Cost/SF List 648.

Each list includes a plurality of items that correspond to other items on other lists. For example, Wages Administration Second Level Project Parameter 621 in Second Level Project Parameter List 622 corresponds to Quantity Field 623, Quantity Field 633, Unit Field 625, $/Unit Field 627, $/Unit Field 634, Total Field 629, Total Field 635, Cost/SF Field 631, and Cost/SF Field 636 in the other lists.

As with Browser Screen 400, the ROM Narrative System may be configured to account for an input change in one list item in Browser Screen 600 by making corresponding input changes in other corresponding items on the other lists. For example, an estimator's change in the input in Quantity Field 633 that corresponds to Wages Administration Second Level Project Parameter 621 may affect the input for $/Unit Field 634, Total Field 635, and Cost/SF Field 636. The corresponding items may interrelate based at least partially on some mathematical algorithm and/or one or more rules. For example, in this embodiment, the input for Total Field 635 equals the input for Quantity Field 633 multiplied by the input for $/Unit Field 634, which is then further multiplied by an index multiplier of 0.8 (not shown) to index for fuel, materials, and/or fuel costs at this particular project location.

In one embodiment, Browser Screen 600 is configured to implement the event represented by block 145 in FIG. 1. Accordingly, once the estimator reviews every input associated with every first level project parameter and makes recommendations, the estimator reviews every second level project parameter input and cost estimate and makes recommendations. As illustrated in FIG. 6, the estimator may recommend inputs associated with second level project parameters by directly entering the recommended input alongside the input populated by the ROM Narrative System and approved by the project manager. For example, as illustrated in FIG. 6, the project manager has approved the input 25,800 into $/Unit Field 627 associated with Wages Administration Second Level Project Parameter 621. As illustrated, the estimator may agree with this input and recommend using that same input by also entering 25,800 into $/Unit Field 634 in Estimator $/Unit List 644. In another embodiment not shown, the estimator may know, based on past experience, that the cost per month for wages associated with labor are actually $25,000 per month, not $25,800 per month. Accordingly, the estimator may recommend the different amount by entering it into $/Unit Field 634 and note the reason for the change in a Note Field (not shown) by selecting Note Button 638 in Note List 637.

As with Browser Screen 400, it will be understood that some fields in Browser Screen 600 may not be directly fillable, e.g. the ROM Narrative System may automatically populate one or more inputs that the estimator may not be able to change at all and/or the ROM Narrative System may populate one or more inputs based on other inputs for corresponding items. For example, FIG. 6 shows that the estimator may enter an input associated with Wages Administration Second Level Project Parameter 621 in Quantity Field 633, but that corresponding Unit Field 625 and Total Field 635 are automatically filled by the ROM Narrative System and may not be directly changed by the estimator. In this case, Unit Field 625 is not changeable at all because the ROM Narrative System is configured to read that field in units of square feet. On the other hand, Total Field 635 may not be directly changed, but it may be changed indirectly by changing, for example, the input in $/Unit Field 634.

Also as with Browser Screen 400, it will be understood that Browser Screen 600 shows an exemplary list of second level project parameters in an exemplary list of second level project parameter categories and subcategories. Indeed, these second level project parameters, categories, and subcategories may only constitute a fraction of the total number of second level project parameters used to estimate project costs. Other second level project parameters may also be used, including those mentioned above in connection with FIG. 4. Additionally, other second level project parameter categories and/or subcategories may also be used, including those mentioned above in connection with FIG. 4.

After reviewing, revising, and recommending, the estimator may select Submit For PM Review Button 650, upon which the ROM Narrative System presents Browser Screens 500 and 600, or other browser screens at least partially similar thereto, to the project manager for review, as represented by block 150 in process flow 100. This event gives the project manager a "second pass" at the information for the renovation project based on the estimator's recommendations. However, unlike Browser Screens 500 and 600, the inputs for every field in the estimator lists are locked, whereas the inputs for every field in the project manager lists are changeable. Further, it will be understood that the ROM Narrative System may not require the project manager to make any revisions to the project manager's own inputs. Indeed, in some scenarios, the estimator may not have any inputs for any first and/or second level project parameters and/or cost estimates that differ from the project manager's. In other scenarios, the project manager may reject the estimator's recommended inputs for one or more first and/or second level project parameters and/or cost estimates. In any event, after the project manager is finished making any revisions, the ROM Narrative System presents Browser Screen 700 illustrated in FIG. 7 to the project manager.

Referring now to FIG. 7, Browser Screen 700 includes Additional Scope Project Parameter Box 710, Save Button 730, Skip This Button 740, and Apply Button 750. Additional Scope Project Parameter Box 710 includes Additional Scope Project Parameter List 712, Quantity List 714, Unit List 716, $/Unit (dollar per unit) List 718, Total List 720, Cost/SF (cost per square foot) List 722, and Note List 724. The additional scope project parameters in Additional Scope Project Parameter List 712 and their corresponding inputs (here, all zero) are populated by the ROM Narrative System. Each list includes a plurality of items that correspond to other items on other lists. For example, Artwork Purchase Additional Scope Project Parameter 711 in Additional Scope Project Parameter List 712 corresponds to Quantity Field 713, Unit Field 715, $/Unit Field 717, Total Field 719, Cost/SF Field 721, and Note Button 723 in the other lists.

Further, Additional Scope Project Parameter List 712 may be further divided up by additional scope project parameter category and/or subcategory, such as Capital Category 724 having Subtotal Corporate Workplace Capital Expenditures Subcategory 725 and Subtotal Corporate Workplace Furniture Estimate Subcategory 726. Additional Scope Project Parameter List 712 may include other categories and subcategories as well, including Subtotal Corporate Workplace Furniture Estimate Subcategory, Subtotal Client/User Capital Expenditures Subcategory, Expense Category, Subtotal Corporate Workplace Expenses Subcategory, Subtotal Corporate Workplace Expenses Subcategory, Subtotal Client/User Expenses Subcategory, Subtotal Telecom Project Cost Subcategory, and/or Grand Total Category.

Further, the ROM Narrative System may be configured to account for an input change in one list item in Browser Screen 700 by making corresponding input changes in other corresponding items on the other lists. For example, a change in the input in Quantity Field 713 that corresponds to Artwork Purchase Additional Scope Project Parameter 711 may affect the input for $/Unit Field 717, Total Field 719, and Cost/SF Field 721. The corresponding items may interrelate based at least partially on some mathematical algorithm and/or one or more rules. For example, in this embodiment, the input for Total Field 719 equals the input for Quantity Field 713 multiplied by the input for $/Unit Field 717, which is then further multiplied by an index multiplier of 0.8 (not shown) to index for prices associated with a particular project location.

In one embodiment, Browser Screen 700 is configured to implement the event represented by block 155 in FIG. 1. Accordingly, Browser Screen 700 provides the project manager an opportunity to provide additional scope to the total cost estimate for the project beyond the more typical calculations performed by the ROM Narrative System. For example, the project manager may know additional information about the price of artwork purchased for the renovation project that would be difficult for the ROM Narrative System to estimate with any accuracy. In such a case, the project manager may enter an input for Quantity Field 713 and $/Unit Field 717 associated with Artwork Purchase Additional Scope Project Parameter 711 to improve the accuracy of the total cost estimate for the renovation project.

As with some other browser screens described herein, it will be understood that some fields in Browser Screen 700 may not be directly fillable, e.g. the ROM Narrative System may automatically populate one or more inputs that the estimator may not be able to change at all and/or the ROM Narrative System may populate one or more inputs based on other inputs for corresponding items. For example, FIG. 7 shows that the project manager may enter an input associated with Artwork Purchase Additional Scope Project Parameter 711 in Quantity Field 713, but that corresponding Unit Field 716 and Total Field 720 are automatically filled by the ROM Narrative System and may not be directly changed by the project manager. In this case, Unit Field 716 is not changeable at all because the ROM Narrative System is configured to read that field in units of large scale. On the other hand, Total Field 720 may not be directly changed, but it may be changed indirectly by changing, for example, the input in $/Unit Field 717.

Also as with some other browser screens described herein, it will be understood that Browser Screen 700 shows an exemplary list of additional scope project parameters in an exemplary list of additional scope project parameter categories and subcategories. Indeed, these additional scope project parameters may only constitute a fraction of the total number of additional scope project parameters used to estimate project costs. In addition to those additional scope project parameters shown in FIG. 7, other additional scope project parameters may include, for example, equipment, systems furn/furn-new, furniture refurbishment, furniture reconfig/box move, furniture repair/refurb/maint, surplus furniture moving, mold remediation, abandoned property project costs, CW project write offs, CW expense management fee, hanging/framing artwork, surplus furniture moving, miscellaneous, management fees, architect & engineering, LOB project write-offs, and/or communication equipment (cap ex).

It will be understood that a project manager may not know any additional scope about a project and will not need Browser Screen 700. In such a case, the project manager may bypass this browser screen altogether by selecting Skip This Button 740. However, if the project manager does provide additional scope to the project, the project manager may save the information by selecting Save Button 440. Also, the project manager may also finalize the information for the new project by selecting Apply Button 750. In one embodiment, the project manager may not be able to change any inputs for any of the fields for the new projects after selecting Apply Button 750. In another embodiment, as represented by block 160 in process flow 100, after the project manager selects Apply Button 750, all of the information for the new project, including every input associated with every first, second, and/or additional scope project parameter, is archived for later use, such as, for example, in providing project parameters and estimating costs associated with a future similar project.

In another embodiment, as represented by block 165 in process flow 100, all of the information for the new project is finalized and reformatted for application to a budget. Browser Screen 800 in FIG. 8 illustrates one embodiment of this event. As shown, Browser Screen 800 includes Project Description Box 810, Final Project Parameter Box 820, and Done Button 840. Project Description Box 810 further includes Building Area SF (square footage) Project Parameter 811 with Input Field 812, ROM/Building SF (rough order of magnitude per building square footage) 813 with Input Field 814, # (Number) of Full-Time Employees Each Project Parameter 815 with Input Field 816, and ROM/FTE (rough order of magnitude per full time employee) Project Parameter 817 with Input Field 818.

In general terms, Browser Screen 800 illustrates the final information for the new project that has been reformatted for application to the construction organization's capital plan. The final information in Project Description Box 810 provides general information about the renovation project. For example, based on the project parameters and their inputs, the area to be renovated is 20,000 square feet, requires 80 full-time employees, and will cost $63.51 per square foot or $15,878.14 per full-time employee.

Final Project Parameter Box 820 further includes Final Project Parameter List 822, Cost Code List 824, Account Code List 826, Unit Cost List 828, and Total Cost List 830. Each of the items in one list corresponds to one or more items in the other lists. For example, Artwork Purchase Project Parameter 821 corresponds to Cost Code Entry 823, Account Code Entry 826, Unit Cost Entry 827, and Total Cost Entry 829. As shown from Unit Cost Entry 827 and Total Cost Entry 829, the new renovation project does not include any estimated costs for artwork purchases, and the corresponding Cost Code Entry 823 and Account Code Entry 826 may reflect this and/or other information. On the other hand, as shown from Unit Cost Entry 835 and Total Cost Entry 836, the unit cost for Cabling Project Parameter 832 is $1,250.00 per unit for a total cost of $80,000. Cost Code Entry 833 and Account Code Entry 834 may reflect this information and/or other information associated with Cabling Project Parameter 832. These and the other lists illustrated in FIG. 8 are populated by the ROM Narrative System based on previous inputs from the project manager and/or one or more rules. The codes listed in Cost Code List 824 and Account Code List 826 are formatted to conform to certain standards required by the construction organization, which allows, for example, the information to be applied to the construction organization's capital plan and/or used in connection with any other system(s) configured to read those codes.

Further, Final Project Parameter List 822 may be further divided up by final project parameter category and/or subcategory, such as Corporate Workplace Capital Expenditures Category 831. Final Project Parameter List 822 may include other categories and subcategories as well, including a Corporate Workplace Expenses Category, Corporate Workplace Furniture Estimate Category, Corporate Workplace Security Estimate, Client/User Capital Expenditures Category, Client/User Expenses Category, and/or a Telecom Project Cost Category. Browser Screen 800 may also include subtotals for each of the above defined categories and a Grand Total Project Cost (ROM), which represents the total cost estimate for the new renovation project.

As with the other browser screens described herein, it will be understood that Browser Screen 800 shows an exemplary list of final project parameters in an exemplary list of final project parameter categories and subcategories. Also, these final project parameters may only constitute a fraction of the total number of final project parameters used to estimate project costs. Additionally, some final project parameters may reflect one or more first level, second level, and/or additional scope project parameters combined, while other final project parameters may derived from one or more first level, second level, and/or additional scope project parameters. In addition to those final project parameters shown in FIG. 8, other final project parameters may include, for example, management fees, furniture reconfig/box move, furniture repair/refurb/maint, hanging/framing artwork, surplus furniture moving, miscellaneous, architect & engineering, mold remediation, abandoned property project costs, CW project write offs, management fees, CW/system furniture-new, furniture refurbishment, security equipment, equipment, systems furn/furn-new, LOB project write offs, communication equipment (cap ex), CW telecom (expense), and/or LOB telecom (expense).

After viewing Browser Screen 800, the project manager may select Done Button 840, upon which the ROM Narrative System may return the project manager to a log-in browser screen, a project overview browser screen, and/or some other type of browser screen configured to implement an embodiment of the ROM Narrative System.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A method implemented by a computerized apparatus configured to estimate building construction or building renovation project costs, the method comprising:

receiving, from a user, one or more inputs for first general level building construction or building renovation project parameters, wherein the one or more inputs for first general level building construction or building renovation project parameters is useable by the apparatus to populate one or more inputs for first specific level building construction or building renovation project parameters;

determining, by a computer processing device, one or more inputs for second general level building construction or building renovation project parameters based at least partially, on a comparison of the one or more inputs for the first general level building construction or building renovation project parameters to a first rule, wherein the one or more inputs for second general level building construction or building renovation project parameters are missing inputs of the one or more inputs for the first general level building construction or building renovation project parameters required for determining a building construction or building renovation project cost estimate and that the user did not input, wherein the one or more inputs for second general level building construction or building renovation project parameters are useable by the apparatus to populate one or more inputs for second specific level building construction or building renovation project parameters, and wherein the one or more inputs for second general level building construction or building renovation project parameter are associated with the one or more inputs for first general level building construction or building renovation project parameters as defined by the first rule; and wherein at least one of the one or more first or second general level building construction or building renovation project parameters relate to a room type for the building construction or building renovation project, and wherein upon receiving the room type, determining, based at least partially on the room type, first or second specific level building construction or building renovation project parameters relating to finishes and furnishings for applying to the room type;

displaying to the user the one or more inputs for second general level building construction or building renovation project parameters for verification by the user prior to determining the project cost estimate;

determining the one or more inputs for second specific level building construction or building renovation project parameters, based at least partially, on a comparison of the one or more inputs for second general level building construction or building renovation project parameters and a second rule;

wherein the first rule and the second rule relate at least partially to information from at least one prior building construction or building renovation project; and determining, by the computer processing device, the building construction or building renovation project cost estimate based at least partially on:

a) the one or more inputs for first general level building construction or building renovation project parameters and b) the one or more inputs for second general level building construction or building renovation project parameters and c) a geographic location of the building construction or building renovation project, wherein an index multiplier is determined based on the geographic location, and wherein the index multiplier is applied to the one or more inputs for first and second general level project parameters for determining a modified price or cost for materials or commodities associated with the first and second general level project parameters; and d) cost data relating to variability in commodity pricing based on non-conventional occurrences relating to shipping disruptions of commodities or inclement weather that affect prices of commodities to be used in the building construction or building renovation project, wherein the cost data is updated substantially in real time as events relating the non-conventional occurrences.

2. The method of claim 1, further comprising storing the one or more inputs for first general level building construction or building renovation project parameters, one or more inputs for first specific level building construction or building renovation project parameters, one or more inputs for second general level building construction or building renovation project parameters, one or more inputs for second specific level building construction or building renovation project parameters, and cost estimate in a memory.

3. The method of claim 1, further comprising configuring the cost estimate for application to a capital plan for a financial institution.

4. The method of claim 3, further comprising applying the cost estimate to the capital plan substantially in real time.

5. The method of claim 3, wherein the computer processing device is configured to reformat any or all of the one or more building construction or building renovation inputs for the first and second general level building construction or building renovation project parameters and the one or more building construction or building renovation inputs for the first and second specific level building construction or building renovation project parameters into a plurality of codes that are configured to be readable by the capital plan.

6. The method of claim 1, wherein the one or more inputs for first general level building construction or building renovation project parameters relates at least partially to a quantity.

7. The method of claim 1, wherein the first rule and the second rule relate at least partially to information from a prior building construction or building renovation project associated with a financial institution.

8. The method of claim 1, wherein the first rule and the second rule are updated by a user.

9. The method of claim 1, further comprising communicating any of the one or more inputs for first general level building construction or building renovation project parameters, one or more inputs for first specific level building construction or building renovation project parameters, one or more inputs for second general level building construction or building renovation project parameters, and one or more inputs for second specific level building construction or building renovation project parameters to an estimator for review.

10. The method of claim 1, wherein the one or more building construction or building renovation inputs for the second general level building construction or building renovation project parameters are associated with the one or more building construction or building renovation inputs for the first general level building construction or building renovation project parameters that are unknown to the user and determined by the computer processing device.

11. A method for estimating costs of a building construction or building renovation project comprising:
- receiving, from a user, one or more first general building construction or building renovation inputs, wherein the one or more first general building construction or building renovation inputs are useable to populate one or more first specific building construction or building renovation project parameters;
- determining, by a computer processing device, the one or more second general building construction or building renovation inputs based at least partially on a comparison of the one or more first general building construction or building renovation inputs to a first rule, wherein the one or more second general building construction or building renovation inputs are missing inputs of the one or more first general building construction or building renovation inputs required for determining the building construction or building renovation project cost estimate and that the user did not input, wherein the one or more second general building construction or building renovation inputs are useable to populate one or more second specific building construction or building renovation project parameters, and wherein the one or more second general building construction or building renovation inputs are associated with the one or more first general building construction or building renovation inputs as defined by the first rule;
- displaying to the user the one or more second general building construction or building renovation inputs for verification by the user prior to determining the building construction or building renovation project cost estimate;
- determining the one or more second specific building construction or building renovation project parameters based at least partially on a comparison of the one or more second general level building construction or building renovation inputs to a second rule;
- wherein at least one of the one or more first or second general level building construction or building renovation inputs relate to a room type for the building construction or building renovation project, and wherein upon receiving the room type, determining, based at least partially on the room type, first or second specific level building construction or building renovation project parameters relating to finishes and furnishings for applying to the room type; and
- determining, by the computer processing device, the building construction or building renovation project cost estimate based at least partially on:
  a) the one or more first general building construction or building renovation inputs and
  b) the one or more second general building construction or building renovation inputs and
  c) a geographic location of the building construction or building renovation project, wherein an index multiplier is determined based on the geographic location, and wherein the index multiplier is applied to the one or more first and second general building construction or building renovation inputs for determining a modified price or cost for materials or commodities associated with the first and second general building construction or building renovation project parameters; and
  d) cost data relating to variability in commodity pricing based on non-conventional occurrences relating to shipping disruptions of commodities or inclement weather that affect prices of commodities to be used in the building construction or building renovation project, wherein the cost data is updated substantially in real time as events relating the non-conventional occurrences.

12. The method of claim 11, wherein the first rule and the second rule relate at least partially to information from a prior building construction or building renovation project associated with a financial institution stored in a memory.

13. The method of claim 11, wherein the first rule and the second rule are updated by a user.

14. The method of claim 11, further comprising storing the one or more first general building construction or building renovation inputs, one or more first specific level building construction or building renovation project parameters, one or more second general inputs, one or more second specific level building construction or building renovation project parameters, and cost estimate in a memory.

15. The method of claim 11, wherein the cost data relates at least partially to a market price.

16. The method of claim 11, further comprising configuring the project cost estimate for application to a capital plan.

17. The method of claim 11, further comprising communicating any of the one or more first general building construction or building renovation inputs, one or more first specific level building construction or building renovation project parameters, one or more second general building construction or building renovation inputs, one or more second specific level building construction or building renovation project parameters, and project cost estimate to an estimator for review.

18. A building construction or building renovation project cost modeling system comprising:
- a communication interface configured to receive, from a user, one or more first general level building construction or building renovation inputs corresponding to one or more first specific level building construction or building renovation project parameters;
- a memory configured to store a rule; and
- a processor operatively connected to the communication interface and the memory and configured to:
  - determine one or more second general level building construction or building renovation inputs based at least partially on a comparison of the one or more first general level building construction or building renovation inputs to at least the rule, wherein the one or more inputs for second general level building construction or building renovation inputs are missing inputs of the one or more inputs for first general level building construction or building renovation inputs required for determining a project cost estimate and that the user did not input, wherein the one or more second general level building construction or building renovation inputs are associated with the one or more first general level building construction or building renovation inputs as defined by the rule, wherein the rule relates at least partially to information from at least one prior building construction or building renovation project;
  - display to the user the one or more inputs for second general level building construction or building renovation inputs for verification by the user prior to determining the building construction or building renovation project cost estimate;
  - determine the one or more second specific level building construction or building renovation project parameters based at least partially on a comparison of the one or more second general level building construction or building renovation inputs to the rule; and
  - wherein at least one of the one or more first or second general level building construction or building renovation inputs relate to a room type for the building construction or building renovation project, and wherein upon receiving the room type, determining, based at least partially on the room type, first or second specific level building construction or building renovation project parameters relating to finishes and furnishings for applying to the room type; and determine the building construction or building renovation project cost estimate based at least partially on:

a) the one or more inputs for first general level building construction or building renovation project parameters and b) the one or more inputs for second general level building construction or building renovation project parameters and c) a geographic location of the building construction or building renovation project, wherein an index multiplier is determined based on the geographic location, and wherein the index multiplier is applied to the one or more inputs for first and second general level project parameters for determining a modified price or cost for materials or commodities associated with the first and second general level project parameters; and d) cost data relating to variability in commodity pricing based on non-conventional occurrences relating to shipping disruptions of commodities or inclement weather that affect prices of commodities to be used in the building construction or building renovation project, wherein the cost data is updated substantially in real time as events relating the non-conventional occurrences.

19. The system of claim 18, wherein the rule relates at least partially to information about a prior building construction or building renovation project associated with a financial institution stored in the memory.

20. The system of claim 18, wherein the memory is configured to store a second rule, and wherein the processor is configured to determine another one or more first general level building construction or building renovation inputs for another one or more first specific level building construction or building renovation project parameters based at least partially on a comparison of the another one or more first specific level building construction or building renovation project parameters to the second rule.

21. The system of claim 18, wherein the processor is further configured to transform each of the first general level building construction or building renovation input, first specific level building construction or building renovation project parameter, second general level building construction or building renovation input, second specific level building construction or building renovation project parameter, and cost estimate into a format suitable for application to a capital plan.

22. The system of claim 18, wherein the processor is further configured to store the one or more first general level building construction or building renovation inputs, one or more first specific level building construction or building renovation project parameters, one or more second general level building construction or building renovation inputs, one or more second specific level building construction or building renovation project parameters, and cost estimate in a memory.

23. The system of claim 18, wherein the communication interface is configured to provide the user with a plurality of first specific level building construction or building renovation project parameters, wherein the communication interface is configured to receive a first general level building construction or building renovation input for less than all of the plurality of building construction or building renovation project parameters, wherein the building construction or building renovation project parameters comprise a first specific building construction or building renovation project parameter and a second specific building construction or building renovation project parameter, wherein the processor is configured to determine a second general level building construction or building renovation input for each of the plurality of building construction or building renovation project parameters for which a first general level building construction or building renovation input was not received from the communication interface, and wherein the processor is configured to determine a cost model based at least partially on the first general level building construction or building renovation inputs and second general level building construction or building renovation inputs for the plurality of project parameters.

24. A computer program product for estimating project costs, the computer program product comprising a non-transitory computer-readable storage medium having computer-readable program code instructions stored therein, the computer-readable program code instructions comprising:

instructions to receive, from a user, one or more first general level building construction or building renovation inputs corresponding to one or more first specific level building construction or building renovation project parameters;

instructions to determine one or more second general level building construction or building renovation inputs based at least partially on a comparison of the one or more first general level building construction or building renovation inputs to at least a first rule, wherein the one or more second general level building construction or building renovation inputs are missing inputs of the one or more inputs for the first general level building construction or building renovation inputs required for determining a building construction or building renovation project cost estimate and that the user did not input;

instruction to display to the user the one or more second general level building construction or building renovation inputs for verification by the user prior to determining the building construction or building renovation project cost estimate;

instructions to determine one or more second specific level building construction or building renovation project parameters based at least partially on a comparison of the one or more second general level building construction or building renovation inputs to a second rule, wherein the first rule and the second rule relate at least partially to information from at least one prior building construction or building renovation project, and wherein at least one of the one or more first or second general level building construction or building renovation inputs relate to a room type for the building construction or building renovation project, and wherein upon receiving the room type, determining, based at least partially on the room type, first or second specific level building construction or building renovation project parameters relating to finishes and furnishings for applying to the room type; and instructions to determine the building construction or building renovation project cost estimate based at least partially on:

a) the one or more first general level building construction or building renovation project parameters and
b) the one or more second general level building construction or building renovation project parameters and
c) a geographic location of the building construction or building renovation project, wherein an index multiplier is determined based on the geographic location, and wherein the index multiplier is applied to the one or more inputs for first and second general level project parameters for determining a modified price or cost for materials or commodities associated with the first and second general level project parameters; and
d) cost data relating to variability in commodity pricing based on non-conventional occurrences relating to shipping disruptions of commodities or inclement weather that affect prices of commodities to be used in the building construction or building renovation project, wherein the cost data is updated substantially in real time as events relating the non-conventional occurrences.

25. The computer program product of claim 24, wherein the first rule and the second rule relate at least partially to information from a prior building construction or building renovation project associated with a financial institution.

26. The computer program product of claim 24, further comprising:
instructions configured to communicate any of the one or more first general level building construction or building renovation inputs, one or more first level building construction or building renovation project parameters, one or more second general level building construction or building renovation inputs, and one or more second level building construction or building renovation project parameters to a second user for review;
instructions configured to receive recommended changes to the one or more first level building construction or building renovation inputs, one or more first level building construction or building renovation project parameters, one or more second level building construction or building renovation inputs, or one or more second level building construction or building renovation project parameters from the second user; and
instructions configured to communicate the recommended changes to the first user.

* * * * *